United States Patent
Gilson (10) Patent No.: US 10,726,871 B2
(45) Date of Patent: Jul. 28, 2020

(54) VARIABLE SPEED PLAYBACK

(71) Applicant: Comcast Cable Communications, LLC, Philadelphia, PA (US)

(72) Inventor: Ross Gilson, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 530 days.

(21) Appl. No.: 14/994,783

(22) Filed: Jan. 13, 2016

(65) Prior Publication Data

US 2016/0210997 A1     Jul. 21, 2016

Related U.S. Application Data (63) Continuation of application No. 14/467,785, filed on Aug. 25, 2014, now Pat. No. 9,269,396, which is a continuation of application No. 13/193,710, filed on Jul. 29, 2011, now Pat. No. 8,849,948.

(51) Int. Cl.
| | |
|---|---|
| *G06F 15/16* | (2006.01) |
| *G11B 27/00* | (2006.01) |
| *H04N 21/2387* | (2011.01) |
| *H04N 5/783* | (2006.01) |
| *H04N 21/258* | (2011.01) |

(52) U.S. Cl.
CPC .......... *G11B 27/005* (2013.01); *H04N 5/783* (2013.01); *H04N 21/2387* (2013.01); *H04N 21/25891* (2013.01)

(58) Field of Classification Search
CPC . H04N 5/783; H04N 21/4532; H04N 21/4331
USPC ....................................... 709/203, 217, 219
See application file for complete search history.

(56) References Cited

U.S. PATENT DOCUMENTS

| | | | |
|---|---|---|---|
| 5,087,980 A | * | 2/1992 | Staffer ................. G04G 15/006 386/205 |
| 6,172,712 B1 | | 1/2001 | Beard |
| 6,327,574 B1 | | 12/2001 | Kramer et al. |
| 6,446,119 B1 | | 9/2002 | Olah et al. |
| 6,453,347 B1 | | 9/2002 | Revashetti et al. |
| 6,460,036 B1 | | 10/2002 | Herz |
| 6,820,277 B1 | | 11/2004 | Eldering et al. |
| 6,850,252 B1 | | 2/2005 | Hoffberg |

(Continued)

FOREIGN PATENT DOCUMENTS

| | | |
|---|---|---|
| CA | 2783852 | 7/2012 |
| CA | 2783852 A1 | 1/2013 |

(Continued)

OTHER PUBLICATIONS

U.S. Appl. No. 13/193,710, filed Jul. 29, 2011, U.S. Pat. No. 8,849,948, Sep. 30, 2014, Ross Gilson.

(Continued)

*Primary Examiner* — Phuoc H Nguyen
(74) *Attorney, Agent, or Firm* — Ballard Spahr LLP (57) ABSTRACT

Provided are methods and systems for variable speed playback. In one aspect the disclosure provides for receiving content having a first playback speed, determining a second playback speed for at least a portion of the content based on a playback factor, associating the second playback speed with the portion of the content, and providing at least the portion of the content at the second playback speed to a display device.

20 Claims, 7 Drawing Sheets

(56) References Cited

U.S. PATENT DOCUMENTS

| | | | |
|---|---|---|---|
| 7,237,254 B1 * | 6/2007 | Omoigui | H04N 7/17318 |
| | | | 348/E7.071 |
| 7,274,775 B1 * | 9/2007 | Zavaliagkos | H04M 3/533 |
| | | | 369/25.01 |
| 7,676,142 B1 * | 3/2010 | Hung | G11B 27/005 |
| | | | 348/446 |
| 8,849,948 B2 | 9/2014 | Gilson | |
| 9,210,204 B2 * | 12/2015 | Crowe | H04L 65/60 |
| 9,269,396 B2 | 2/2016 | Gilson | |
| 2002/0038374 A1 * | 3/2002 | Gupta | H04L 29/06027 |
| | | | 709/231 |
| 2005/0100323 A1 * | 5/2005 | Miyashita | G11B 27/005 |
| | | | 386/343 |
| 2007/0223873 A1 * | 9/2007 | Gilbert | H04N 5/783 |
| | | | 386/350 |
| 2007/0230899 A1 | 10/2007 | Shiiyama | |
| 2008/0304678 A1 * | 12/2008 | Chen | G10L 21/04 |
| | | | 381/71.12 |
| 2010/0023964 A1 | 1/2010 | Basso et al. | |
| 2012/0311083 A1 | 12/2012 | Julia et al. | |
| 2013/0031266 A1 | 1/2013 | Gilson | |
| 2014/0033073 A1 * | 1/2014 | Pegg | H04L 65/403 |
| | | | 715/753 |
| 2015/0043896 A1 | 2/2015 | Gilson | |

FOREIGN PATENT DOCUMENTS

| | | |
|---|---|---|
| DE | 12178357.5 | 7/2012 |
| EP | 12178357.5 | 7/2012 |
| EP | 2552109 A1 | 1/2013 |
| FR | 12178357.5 | 7/2012 |
| GB | 12178357.5 | 7/2012 |
| WO | WO-2004/025953 A1 | 3/2004 |

OTHER PUBLICATIONS

U.S. Appl. No. 14/467,785, filed Aug. 25, 2014, U.S. Pat. No. 9,269,396, Feb. 23, 2016, Ross Gilson.

European Search Report dated Dec. 10, 2012 by the International Searching Authority for Application No. 12178357.5, filed Jul. 27, 2012, and granted as EP 2552109 dated Dec. 27, 2017 (Applicant—Comcast Cable Communications, LLC.) (7 pages).

* cited by examiner

VARIABLE SPEED PLAYBACK

CROSS REFERENCE TO RELATED APPLICATION

This application is a continuation of U.S. application Ser. No. 14/467,785, filed Aug. 25, 2014, which is a continuation of U.S. application Ser. No. 13/193,710, filed Jul. 29, 2011 and issued as U.S. Pat. No. 8,849,948, which are herein incorporated by reference in their entirety.

BACKGROUND

Users are consuming a variety of content through a variety of platforms. Television, movies, music, and the like are consumed daily through computers, televisions, smartphones, and a myriad of other devices. Users are presented with unprecedented selections of what content they want to consume, when they want to consume the content, and where they want to consume the content. Unfortunately, users are limited in how to consume content. Users are restricted to consuming content at a predefined "normal" playback speed that may not be to the user's liking or within the user's time constraints. While manipulating playback speed with "fast forward" and "rewind" functions is known, users have no control over just how fast or slow playback occurs. Similarly, users are unable to dynamically adjust playback speeds for different types of content or segments within content. The present disclosure identifies and addresses a need for a system to enable users to enjoyably consume content at an automatically and dynamically adjusted speed (e.g., faster or slower than normal playback speed) without constant manipulation of "fast forward" or "rewind" functions.

SUMMARY

It is to be understood that both the following general description and the following detailed description are exemplary and explanatory only and are not restrictive, as claimed. Provided are methods and systems for variable speed playback, comprising receiving content comprising a first playback speed, determining a second playback speed for at least a portion of the content based on a playback factor, associating the second playback speed with the portion of the content, and providing at least the portion of the content at the second playback speed to a display device.

Additional advantages will be set forth in part in the description which follows or may be learned by practice. The advantages will be realized and attained by means of the elements and combinations discussed in the disclosure and particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Figure 1:
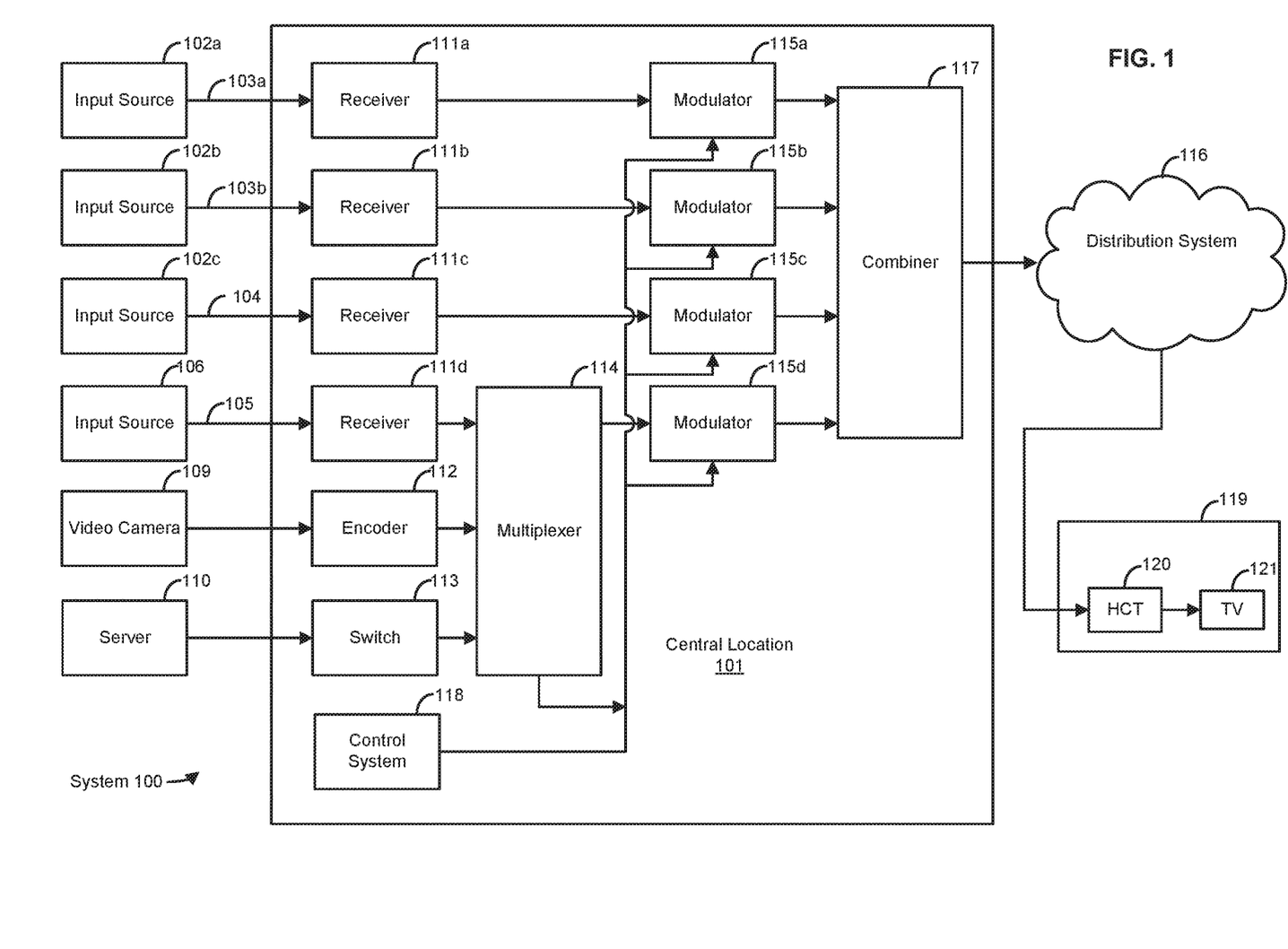
FIG. 1 is an exemplary operating environment.

FIG. 1 illustrates various aspects of an exemplary system in which the present methods and systems can operate. The present disclosure relates to variable speed playback of content. Those skilled in the art will appreciate that the present methods may be used in systems that employ both digital and analog equipment. One skilled in the art will appreciate that provided herein is a functional description and that the respective functions can be performed by software, hardware, or a combination of software and hardware.

The system 100 can comprise a central location 101 (e.g., a headend), which can receive content (e.g., data, input programming, and the like) from multiple sources. The central location 101 can combine the content from the various sources and can distribute the content to user (e.g., subscriber) locations (e.g., location 119) via distribution system 116.

In an aspect, the central location 101 can receive content from a variety of sources 102a, 102b, 102c. The content can be transmitted from the source to the central location 101 via a variety of transmission paths, including wireless (e.g. satellite paths 103a, 103b) and terrestrial path 104. The central location 101 can also receive content from a direct feed source 106 via a direct line 105. Other input sources can comprise capture devices such as a video camera 109 or a server 110. The signals provided by the content sources can include a single content item or a multiplex that includes several content items.

The central location 101 can comprise one or a plurality of receivers 111a, 111b, 111c, 111d that are each associated with an input source. For example, MPEG encoders such as encoder 112, are included for encoding local content or a video camera 109 feed. A switch 113 can provide access to server 110, which can be a Pay-Per-View server, a data server, an internet router, a network system, a phone system, and the like. Some signals may require additional processing, such as signal multiplexing, prior to being modulated. Such multiplexing can be performed by multiplexer (mux) 114.

The central location 101 can comprise one or a plurality of modulators, 115a, 115b, 115c, and 115d, for interfacing to the distribution system 116. The modulators can convert the received content into a modulated output signal suitable for transmission over the distribution system 116. The output signals from the modulators can be combined, using equipment such as a combiner 117, for input into the distribution system 116.

A control system 118 can permit a system operator to control and monitor the functions and performance of system 100. The control system 118 can interface, monitor, and/or control a variety of functions, including, but not limited to, the channel lineup for the television system, billing for each user, conditional access for content distributed to users, and the like. Control system 118 can provide input to the modulators for setting operating parameters, such as system specific MPEG table packet organization or conditional access information. The control system 118 can be located at central location 101 or at a remote location.

The distribution system 116 can distribute signals from the central location 101 to user locations, such as user location 119. The distribution system 116 can be an optical fiber network, a coaxial cable network, a hybrid fiber-coaxial network, a wireless network, a satellite system, a direct broadcast system, or any combination thereof. There can be a multitude of user locations connected to distribution system 116. At user location 119, a decoder 120, such as a gateway or home communications terminal (HCT) can decode, if needed, the signals for display on a display device, such as on a television set (TV) 121 or a computer monitor. Those skilled in the art will appreciate that the signal can be decoded in a variety of equipment, including an HCT, a computer, a TV, a monitor, or satellite dish. In an exemplary aspect, the methods and systems disclosed can be located within, or performed on, one or more HCT's 120, TV's 121, central locations 101, DVR's, home theater PC's, and the like.

In an aspect, user location 119 is not fixed. By way of example, a user can receive content from the distribution system 116 on a mobile device such as a laptop computer, PDA, smartphone, GPS, vehicle entertainment system, portable media player, and the like.

In an aspect, the methods and systems can utilize digital audio/video compression such as MPEG, or any other type of compression. The Moving Pictures Experts Group (MPEG) was established by the International Standards Organization (ISO) for the purpose of creating standards for digital audio/video compression. The MPEG experts created the MPEG-1 and MPEG-2 standards, with the MPEG-1 standard being a subset of the MPEG-2 standard. The combined MPEG-1, MPEG-2, and MPEG-4 standards are hereinafter referred to as MPEG. In an MPEG encoded transmission, content and other data are transmitted in packets, which collectively make up a transport stream. Additional information regarding transport stream packets, the composition of the transport stream, types of MPEG tables, and other aspects of the MPEG standards are described below. In an exemplary embodiment, the present methods and systems can employ transmission of MPEG packets. However, the present methods and systems are not so limited, and can be implemented using other types of transmission and data.

The output of a single MPEG audio and/or video coder is called a transport stream comprised of one or more elementary streams. An elementary stream is an endless near real-time signal. For convenience, the elementary stream may be broken into data blocks of manageable size, forming a packetized elementary stream (PES). These data blocks need header information to identify the start of the packets and must include time stamps because packetizing disrupts the time axis. For transmission and digital broadcasting, for example, several programs and their associated PESs can be multiplexed into a multi program transport stream. A multi program transport stream has a program clock reference (PCR) mechanism that allows transmission of multiple clocks, one of which is selected and regenerated at the decoder.

A multi program transport stream is more than just a multiplex of audio and video PESs. In addition to the compressed audio, video and data, a transport stream includes metadata describing the bit stream. This includes the program association table (PAT) that lists every program in the multi program transport stream. Each entry in the PAT points to a program map table (PMT) that lists the elementary streams making up each program. Some programs will be unencrypted, but some programs may be subject to conditional access (encryption) and this information is also carried in the metadata. The transport stream can be comprised of fixed-size data packets, for example, each containing 188 bytes. Each packet can carry a program identifier code (PID). Packets in the same elementary stream can all have the same PID, so that the decoder (or a demultiplexer) can select the elementary stream(s) it wants and reject the remainder. Packet continuity counts ensure that every packet that is needed to decode a stream is received. A synchronization system can be used so that decoders can correctly identify the beginning of each packet and deserialize the bit stream into words.

A content item, such as a program, can be a group of one or more PIDs that are related to each other. For instance, a multi program transport stream used in digital television might contain three programs to represent three television channels. Suppose each channel consists of one video stream, one or two audio streams, and any necessary metadata. A receiver wishing to tune to a particular "channel" merely has to decode the payload of the PIDs associated with its program. It can discard the contents of all other PIDs.

The multi program transport stream carries many different programs and each may use a different compression factor and a bit rate that can change dynamically even though the overall bit rate stays constant. This behavior is called statistical multiplexing and it allows a program that is handling difficult material to borrow bandwidth from a program handling easy material. Each video PES can have a different number of audio and data PESs associated with it. Despite this flexibility, a decoder must be able to change from one program to the next and correctly select the appropriate audio and data channels. Some of the programs can be protected so that they can only be viewed by those who have paid a subscription or fee. The transport stream can comprise Conditional Access (CA) information to administer this protection. The transport stream can comprise Program Specific Information (PSI) to handle these tasks.

Figure 2:
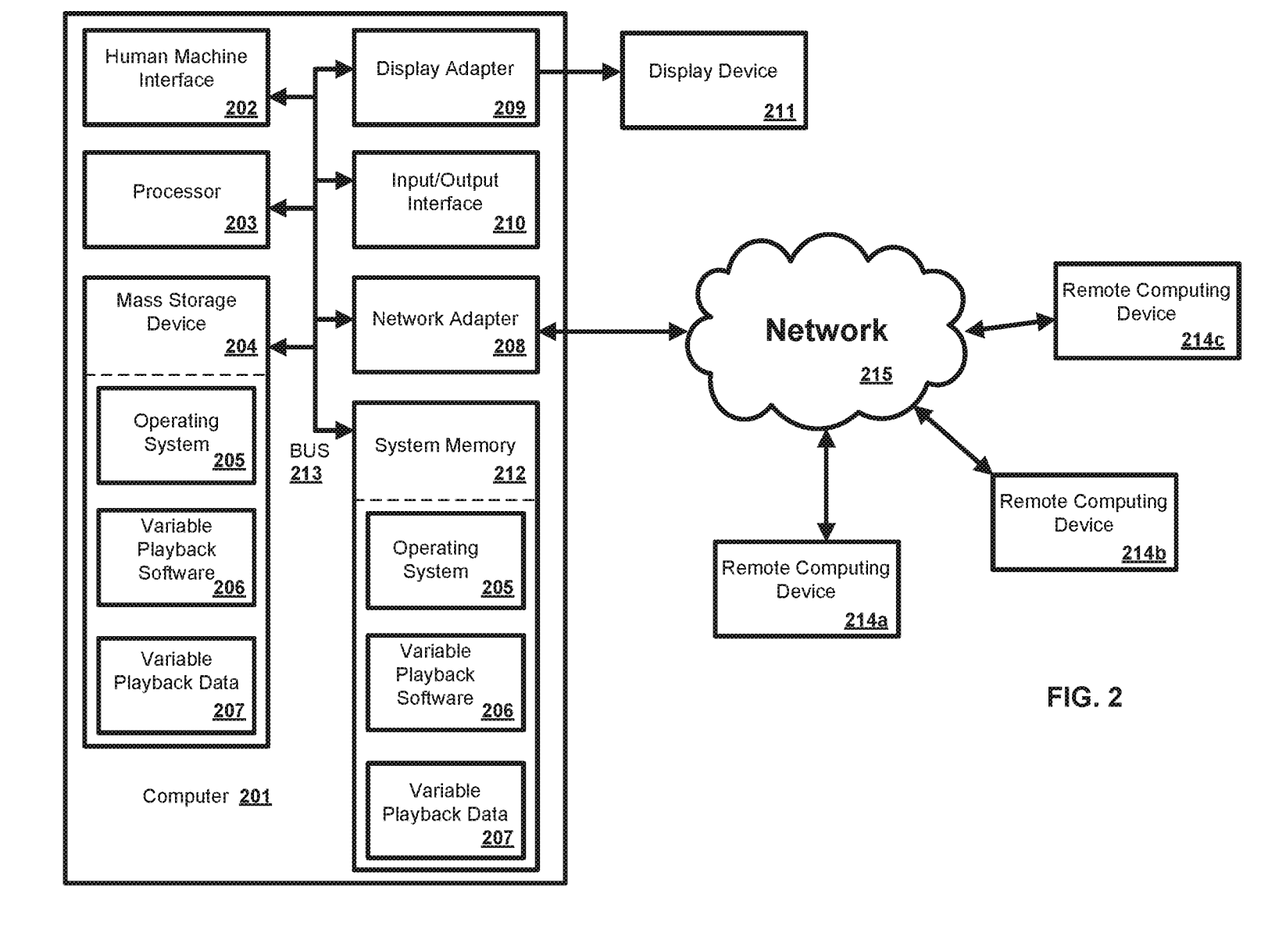
FIG. 2 is another exemplary operating environment.

In an exemplary aspect, the methods and systems can be implemented on a computer 201 as illustrated in FIG. 2 and described below. By way of example, server 110 of FIG. 1 can be a computer as illustrated in FIG. 2. Similarly, the methods and systems disclosed can utilize one or more computers to perform one or more functions in one or more locations. FIG. 2 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 201. The components of the computer 201 can comprise, but are not limited to, one or more processors or processing units 203, a system memory 212, and a system bus 213 that couples various system components including the processor 203 to the system memory 212. In the case of multiple processing units 203, the system can utilize parallel computing.

The system bus 213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnects (PCI), a PCI-Express bus, a Personal Computer Memory Card Industry Association (PCMCIA), Universal Serial Bus (USB), and the like. The bus 213, and all buses specified in this description can also be implemented over a wired or wireless network connection and each of the subsystems, including the processor 203, a mass storage device 204, an operating system 205, variable playback software 206, playback data 207, a network adapter 208, system memory 212, an Input/Output Interface 210, a display adapter 209, a display device 211, and a human machine interface 202, can be contained within one or more remote computing devices 214a,b,c at physically separate locations, connected through buses of this form, in effect implementing a fully distributed system.

The computer 201 typically comprises a variety of computer readable media. Exemplary readable media can be any available media that is accessible by the computer 201 and comprises, for example and not meant to be limiting, both volatile and non-volatile media, removable and non-removable media. The system memory 212 comprises computer readable media in the form of volatile memory, such as random access memory (RAM), and/or non-volatile memory, such as read only memory (ROM). The system memory 212 typically contains data such as playback data 207 and/or program modules such as operating system 205 and variable playback software 206 that are immediately accessible to and/or are presently operated on by the processing unit 203.

In another aspect, the computer 201 can also comprise other removable/non-removable, volatile/non-volatile computer storage media. By way of example, FIG. 2 illustrates a mass storage device 204 which can provide non-volatile storage of computer code, computer readable instructions, data structures, program modules, and other data for the computer 201. For example and not meant to be limiting, a mass storage device 204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 204, including by way of example, an operating system 205 and variable playback software 206. Each of the operating system 205 and variable playback software 206 (or some combination thereof) can comprise elements of the content and the variable playback software 206. In an aspect, variable playback software 206 can comprise standalone software and/or software integrated into existing content players, for example, Windows® Media Player, Realplayer®, iTunes®, and the like. Playback data 207 can also be stored on the mass storage device 204. Playback data 207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 201 via an input device (not shown). Examples of such input devices comprise, but are not limited to, a keyboard, pointing device (e.g., a "mouse"), a microphone, a joystick, a scanner, tactile input devices such as gloves, and other body coverings, and the like. These and other input devices can be connected to the processing unit 203 via a human machine interface 202 that is coupled to the system bus 213, but can be connected by other interface and bus structures, such as a parallel port, game port, an IEEE 1394 Port (also known as a Firewire port), a serial port, or a universal serial bus (USB).

In yet another aspect, a display device 211 can also be connected to the system bus 213 via an interface, such as a display adapter 209. It is contemplated that the computer 201 can have more than one display adapter 209 and the computer 201 can have more than one display device 211. For example, a display device can be a monitor, an LCD (Liquid Crystal Display), or a projector. In addition to the display device 211, other output peripheral devices can comprise components such as speakers (not shown) and a printer (not shown) which can be connected to the computer 201 via Input/Output Interface 210. Any step and/or result of the methods can be output in any form to an output device. Such output can be any form of visual representation, including, but not limited to, textual, graphical, animation, audio, tactile, and the like. The display 211 and computer 201 can be part of one device, or separate devices.

The computer 201 can operate in a networked environment using logical connections to one or more remote computing devices 214a,b,c. By way of example, a remote computing device can be a personal computer, portable computer, smartphone, a server, a router, a network computer, a peer device or other common network node, and so on. Logical connections between the computer 201 and a remote computing device 214a,b,c can be made via a network 215, such as a local area network (LAN) and/or a general wide area network (WAN). Such network connections can be through a network adapter 208. A network adapter 208 can be implemented in both wired and wireless environments. Such networking environments are conventional and commonplace in dwellings, offices, enterprise-wide computer networks, intranets, and the Internet.

For purposes of illustration, application programs and other executable program components such as the operating system 205 are illustrated herein as discrete blocks, although it is recognized that such programs and components reside at various times in different storage components of the computing device 201, and are executed by the data processor(s) of the computer. An implementation of variable playback software 206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g., Expert inference rules generated through a neural network or production rules from statistical learning).

The present disclosure relates to systems that enable a user to consume content (or portions of content) at a slower or faster rate than "normal." A variety of factors impact a user's desire to adjust content consumption rate. For example, a busy user may only have 20 minutes in which to watch a 30 minute television show. The user can, as described herein, view the content with certain portions sped up significantly in order to consume the content in the allotted time. Still other users may have a difficult time visually processing fast action scenes, and can thus consume that type of content at speeds slower than normal. Users can accomplish the adjusted consumption, not by manually pressing "fast forward" or "rewind" buttons (although such buttons/functions may be used in combination with the disclosure), but rather by relying on one or more playback factors as detailed herein.

The disclosure relates to adjusting the speed of content playback with, optionally, audio pitch shifting. One benefit of adjusting the speed of content playback is for users to consume content in less time than it would take to consume such content at a normal speed. In an aspect, the speed adjustment can be applied to portions of a program such that the playback time of the entire program is equivalent to the time it took to air normally. For example, some portions can be played at increased speed and other portions can be played at decreased speed. However, merely increasing the playback speed by a set amount would cause, at certain times, (depending on the talking speed of the speaker, amount of scene/camera cuts, or background noise, number of people speaking, and the like), difficulty in understanding what was said. The disclosure also relates to dynamic adjustment of playback speed. By dynamically adjusting playback speed based on, for example, content type, number of words/second spoken, and user preferences viewers can more easily understand the audio tracks while still maintaining a total play time similar to, or less than, what they would expect with a constant playback value.

Playback speed adjustment can be performed at various points in a content distribution system. For example, playback speed adjustment can be performed at a user's device, at the content creator's facility, at the content provider's facility, at a third party vendor facility, or any combination thereof. Similarly, preferences and profiles for playback speeds can be stored on content media, a user's device, at the content creator's facility, at the content provider's facility, at a third party vendor facility, or any combination thereof. In an aspect, preferences and playback profiles for content can be stored and downloaded through the Internet.

For example, during television shows prior to a commercial, there can be a "tease" for setting up interest in the next segment. Alternatively, there can be a lead out portion with a band playing music and the camera zooming out and panning the audience. A similar segment could occur after the commercial break. These are examples of segments that could be completely cut, but simply cutting out such segments might create too abrupt of a viewing experience. These segments can be sped up slightly or significantly, with a speed that is blended into the adjacent portions of the show's content. In another example, after a comedian tells a joke, the laughter can be sped up and then the playback speed slowed back down before the next joke (similar to a bell curve). These are merely examples of sections or portions of content that can have playback speeds adjusted. There are many other sections of content that can be sped up or slowed down.

Figure 3:
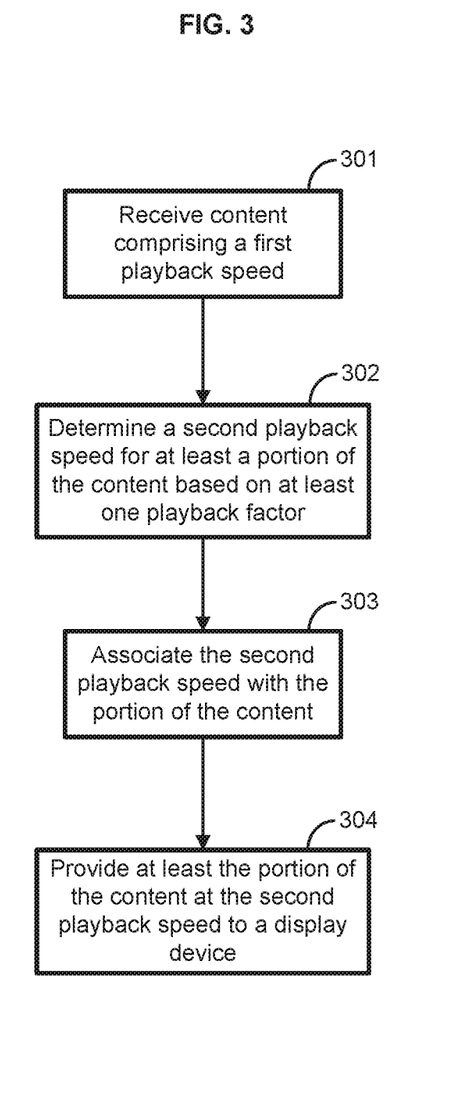
FIG. 3 is an exemplary method.

In an aspect, illustrated in FIG. 3, provided are methods for variable speed playback, comprising receiving content comprising a first playback speed at 301, determining a second playback speed for at least a portion of the content based on at least one playback factor at 302, associating the second playback speed with the portion of the content at 303; and providing at least the portion of the content at the second playback speed to a display device at 304. The methods can comprise determining a third playback speed for at least a second portion of the content based on the playback factor, or other playback factors, associating the third playback speed with the second portion of the content, and transitioning from providing at least the portion of the content at the second playback speed to providing at least the second portion of the content at the third playback speed to the display device.

Figure 4:
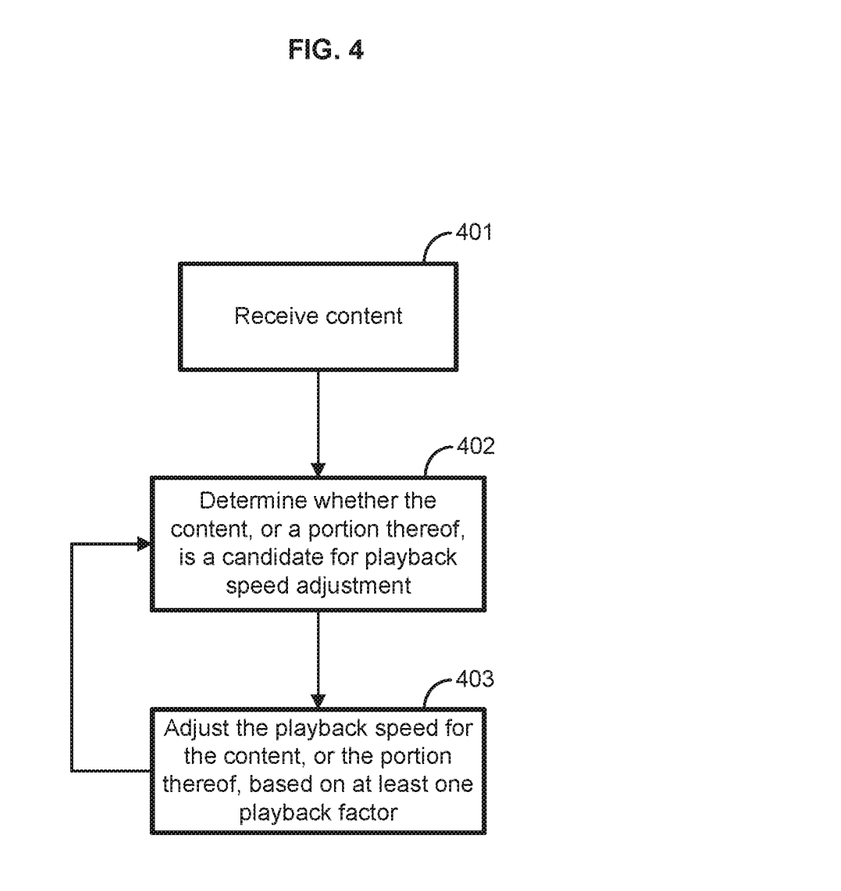
FIG. 4 is another exemplary method.

In a further aspect, illustrated in FIG. 4, provided are methods for variable speed playback, comprising receiving content at 401, determining whether the content, or a portion thereof, is a candidate for playback speed adjustment at 402; and adjusting the playback speed for the content, or the portion thereof, based on at least one playback factor 403. In an aspect, steps 402 and 403 repeat throughout receipt and/or providing of the content in order to dynamically adjust playback speed of the content, or portions thereof, as the content is consumed. In a further aspect, a plurality of playback speeds can be determined. The methods can comprise transitioning from providing the content, or portions thereof, at a first playback speed to providing the content, or portions thereof, at a second playback speed to a display device.

In an aspect, playback speeds can be set greater than or less than the original playback speeds based at least one playback factor. Many situations can exist where playback speed can be adjusted higher or lower than normal to accommodate viewing preferences. For example, the second playback speed can be less than or equal to the first playback speed when multiple people are talking at the same time. By way of example, laugh track playback speed can be increased, static display of information, depending upon type, can be displayed at a decreased or increased playback speed, and the like.

Providing content to a display device can further comprise pitch shifted audio and/or an increased frame rate. To maintain the enjoyment of content, the methods and systems provided can automatically adjust not only video frame rate, but also the pitch of associated audio. This can prevent audio from sounding very high pitched in the event that playback speed is increased and can prevent audio from sounding very low pitched in the event that playback speed is decreased.

In an aspect, the playback factor can comprise one or more of a content type, a user preference profile, a third party playback profile, number of spoken syllables or words per unit of time, frequency of spoken words, comprehension difficulty level, or a rate of spoken words, for example. Content type can comprise, for example, a movie, a commercial, a television program, a music video, or audio only. The user preference profile can comprise a playback speed preferred by an end user and/or parameters selected by the user based on playback factors. For example, a user preference profile can comprise one or more of a slow motion, normal speed, fast, faster, fastest profile. Depending on the segment of content, the speed of playback can be sped up and slowed down according to user preferences. In an aspect, there is no requirement for a linear change between profiles. "Normal" speed can mean the content takes the same amount of time to consume as originally intended, but some portions of the content can be played at <1.0× speed and some portions of the content can be played at >1.0×, averaging out to 1.0× speed. User preferences can be associated with one or more segments of content (e.g., particular scenes), content type, and the like. For example, a user can specify a faster, slower, or normal playback speed for credit rolls, silent scenes, fight scenes, mature scenes, and the like. By way of further example, a user can specify a faster, slower, or normal playback speed for commercials, sitcoms, news reports, weather reports, infomercials, and the like. These user selectable profile speeds can be combined with metadata from a third party profile that describes sections of content to determine which sections are of higher/lower value. Combining the use of the user preference profile with third party profile allows more granular adjustable playback speeds.

The third party playback profile can comprise one or more playback speeds recommended by a third party. For example, the content can be tagged with markers designating the minimum, maximum, and/or average recommended playback speed as recommended by an expert or a friend, such as crowd sourced recommendations or recommendations from a director, editor, and the like. These recommendations can be compiled into a content playback profile. In an aspect, these speeds can be combined with user settings for a final playback value. For example, if a director tags a segment indicating a playback speed of 0.8× min, 1.1× avg, and 1.5× max, and a user has a "normal" playback speed selected (for example, selecting a 5 on a scale from 1 to 10 where 1 is the strongest preference for slow speeds and 10 is the strongest preference for fast speeds), the system can utilize the director's average recommended speed of 1.1. However, if the user has a playback speed setting of 8/10 selected, the system can utilize a playback speed closer to 1.5×, for example 1.4×.

Figure 5:
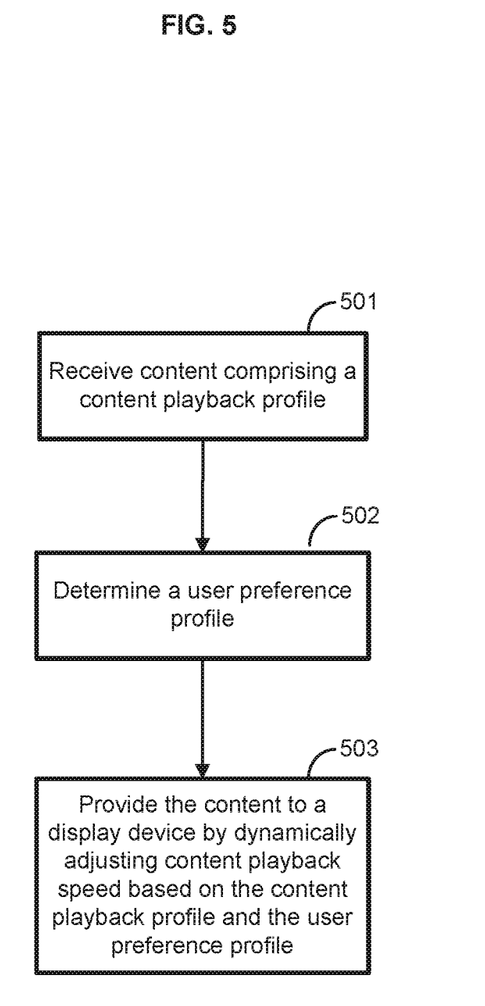
FIG. 5 is another exemplary method.

In an aspect, illustrated in FIG. 5, provided are methods for variable speed playback, comprising receiving content comprising a content playback profile at 501, determining a user preference profile at 502, and providing the content to a display device by dynamically adjusting content playback speed based on the content playback profile and the user preference profile at 503.

As provided herein, the content type can comprise, for example, a movie, a commercial, a television program, a music video, audio only content, and the like. The user preference profile can comprise a playback speed preferred by an end user. For example, the content playback profile can comprise a minimum playback speed, an average playback speed, a maximum playback speed, and the like. In an aspect, the content playback profile can comprise one or more playback speeds associated with segments of the content. By way of example, segments can comprise particular scenes, scene types, content types, and the like.

Figure 6:
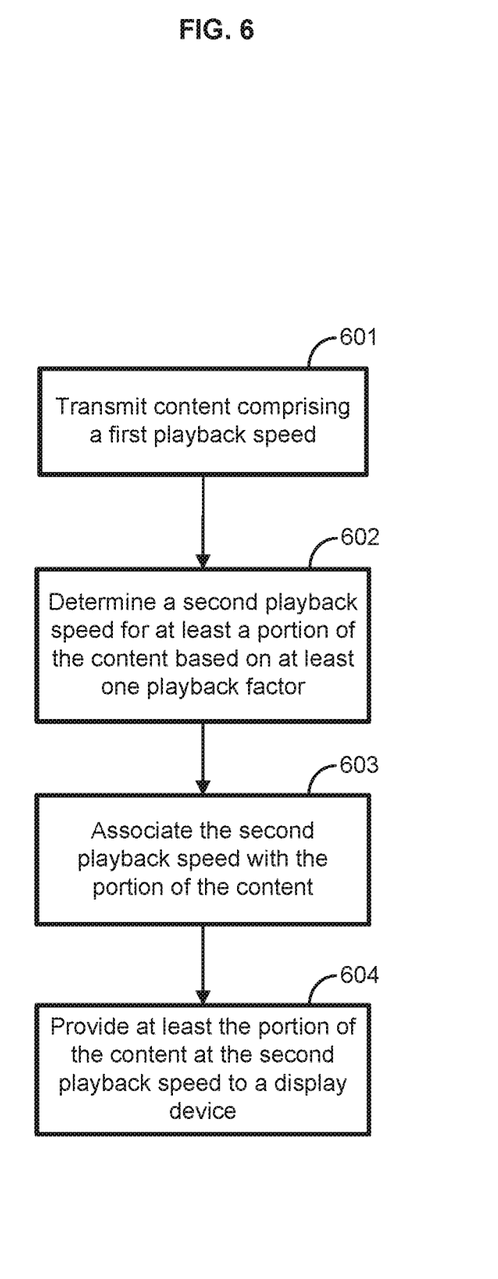
FIG. 6 is another exemplary method.

In a further aspect, illustrated in FIG. 6, provided are methods for variable speed playback, comprising transmitting content comprising a first playback speed at 601, determining a second playback speed for at least a portion of the content based on at least one playback factor at 602, associating the second playback speed with the portion of the content at 603, and providing at least the portion of the content at the second playback speed to a display device at 604.

As disclosed herein, the content type can comprise, for example, a movie, a commercial, a television program, a music video, audio only content, and the like. The at least one playback factor can comprise one or more of a content type, a user preference profile, a third party playback profile, a rate of spoken words, a number of spoken words, a number of spoken syllables, and the like.

The methods can further comprise setting the second playback speed greater than or less than the first playback speed based on the at least one playback factor. The methods can also further comprise displaying the content on the display device at the second playback speed.

In an aspect, provided are methods for translating a user friendly playback setting (e.g., a selection on a scale from 1 to 10) into an actual playback speed. For example, consider the user that selects a playback speed of 3 out of 10. The slowest user setting (1/10) and fastest user setting (10/10) can map to minimum and maximum playback speeds acquired from any source, for example, from the director. The settings in between (2/10-9/10) can be calculated depending on if the user setting was slower than average (5/10) or faster than average (5/10). For example with the user setting at less than average (3/10), a director tagged minimum of 0.8× (1/10), average of 1.1× (5/10), and maximum of 1.5× (10/10), then the playback speed can be determined according to the equation: Min speed+(user setting/(total user settings/2))*(avg playback speed−min playback). Accordingly, a user selection of 3/10 corresponds to a playback speed of 0.8+(3/(10/2))*(1.1−0.8)=0.98×.

In an aspect, playback speed can be adjusted to meet user defined rate of syllables or words per second. This playback factor can comprise a "normal" syllables or words per second that can be calculated from the content, for example a television show (an overall average). The number of words or syllables per second of specific timeframes can be calculated throughout the show or specific types of scenes throughout the show. In an aspect, this number would not be static throughout, but rather would vary during the course of the show. The number can be calculated from the timeframes when closed captions are displayed (minus the character tags and other descriptions of sounds). This number can be considered 1.0× playback syllables/words per second for that timeframe.

In an aspect, the rate of words spoken can be determined by analyzing closed caption data associated with the portion or the entire content to determine a number of spoken words or syllables per minute. Other time frame related rates can be utilized such as per second, per hour, and the like. In an aspect, some live events have delayed closed captions that can be known or detected, so the closed caption data would be shifted by a few seconds before determining playback speed. This does not present a problem since an increased playback speed can not be achieved while watching live content if transmitted at a linear speed. In an aspect, detection of delay can occur automatically by monitoring the audio frequency range of the human voice, and matching those sections of human voice to closed caption data. In another aspect, a speech to text translator can be used to translate voice (e.g., from a center audio channel or unique voice-only audio track) into text in order to determine one or more playback factors disclosed herein such as spoken word rate, syllable rate, and the like.

Figure 7:
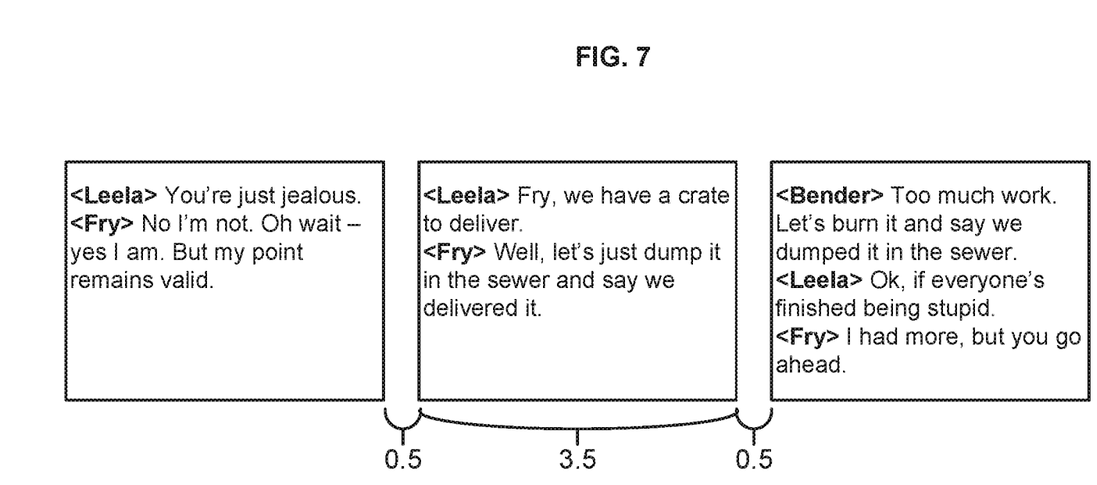
FIG. 7 is an illustration of dialog timing.

FIG. 7 illustrates an example dialog and air times in a piece of content. By way of example, to calculate baseline syllables or words per second, add half of the gap from the previous and following captions on each side of the subject captions (0.25+0.25), plus the timeframe where the subject captions are displayed (3.5), which equals 4.0 seconds. Then the words or syllables per second are calculated (20 words, 25 syllables), which is 5 words per second or 6.25 syllables a second. If the average syllables per second of the entire show is 7.1 syllables/second, and a user enters increased playback at 1.2× for the entire show, (for example: 7.1*1.2=8.52) then 8.52 syllables/second would be the increased playback speed. This same segment that took 4.0 seconds to playback at 1.0× speed would be increased based on this calculation: 25 (syllables)/8.52 (syllables/second) =2.934 seconds to playback (instead of 4.0 seconds). Similar calculations can be performed based on words per second.

In another aspect, overlays can be placed on screens to display information such as phone numbers. These overlays can be used as a playback factor. Overlays can be detected and those segments can have playback speeds slowed down (or sped up) or if enough resources exist that overlay can be "frozen" on screen for the amount of playback time expected at 1.0× speed. Overlays and other static information displayed during a program, such as phone numbers, can be considered more important. The region containing the overlay can be frozen to keep it on screen as long as it was expected to, even when playback is increased. Alternatively, the period during the overlays can be slowed down and treated as more important.

Associating the second and/or additional playback speed with the portion of the content can also comprise adding metadata to the content describing the second playback speed and the particular point within the content. The methods can further comprise displaying the content on the display device at the second and/or additional playback speeds. In an aspect, metadata can be added to "important" segments (voting results, jokes, etc). The methods can weight the segments based on how much time a segment should be or has been allocated in proportion to other segments during playback. For example, segments can be tagged at a recommended min/max/average playback speed for different segments, or the min/max/average can be considered to be its own metadata tagging method. Users can set a percentage of minimum, maximum, or average speed at which they want to view content.

In another aspect, crowd sourcing can be implemented to determine which segments of content most users fast forward through to help determine the most important segments. A content provider can capture feedback from users, for example, such as when/if the user changed between the "user profiles" option of increased playback. This can indicate that the user was not happy with the final weighted playback speed that was selected for them. Statistics can then be taken from all users as to which segments they watched at an increased rate of speed and find the segments which are statistically less important to most users and create a corresponding playback factor.

One or more aspects of determining playback speeds can be implemented in a single method. For example, for movies and highly watched content, metadata can be added (either one or all of methods: profiles/min, max, avg/important segments), but for less watched or some live content where preproduction might not be possible, a client based approach can be used (crowd sourcing/closed caption gathering).

In an aspect, a piece of content can have a plurality of associated playback speeds, with each playback speed associated with a segment or segment-type of the content. The playback speeds can be derived from any of one or more playback factors described herein. By way of example, the plurality of playback speeds for a piece of content can be stored in a playback profile. In the event content has multiple associated playback speeds, the playback speeds can be collected into a playback profile that can be transmitted with the content, or can be separately available from the content. When the content is provided to the user, the system can determine the playback speed associated with that segment or segment-type, and play the content for the user at the appropriate speed. In an aspect, no user intervention is required, or is only required to setup an initial user preference profile. Thus, by way of example, a movie can be consumed wherein the opening credits are automatically played at 1.5×, the action based introductory scene at 1.0×, scenes with no dialog at 2.0×, scenes with sub-titles at 0.8×, and closing credits at 2.0×. The playback speeds can be adjusted automatically, by monitoring transitions between segments and segment-types.

In an aspect, a plurality of different playback speeds can be utilized for a single piece of content, enabling the methods provided to determine when to apply each playback speed. Transitions between playback speeds can be immediate or can be gradual. For example, lead-in and/or lead-out markers indicating transition to/from a commercial can be utilized in determining when to apply a specific playback speed. In another aspect, certain keywords in closed caption data indicating a transition to commercial can be used as a playback factor, for example, if phrases such as "coming up," "after the break," and the like are recognized. These keywords combined with commercial detection and applause (often the audience is cheering/clapping on lead in/out) can determine where lead ins and outs are likely to exist. Keywords can be used for commercial detection, especially if closed captions are recorded between shows, and any commercial that appears more than once can be automatically detected (based on repeated closed captions). Playback speed transition can be based on laughter detection, the few seconds before laughing would likely be more important (the punch line) than the laughter itself.

In another aspect, the absence of closed caption data can be used as a playback factor to indicate a point at which transition between playback speeds is appropriate. The absence of closed caption data for a set period of time, for example, more than several or 10, 20, 30 seconds, and the like, can indicate a transition point for playback speed changes. In yet another aspect, a detected change in the display position of closed caption data can be used as a playback factor to indicate a transition point for playback speed changes. In another aspect, speech types can be used as a playback factor to indicate a transition point for playback speed changes. For example, laughter can be detected, indicating a punch line or situational gag that would be important to the user a few seconds before the laughter, while the laughter itself can be sped up considerably.

One or more modifiers can be assigned to various transition detection schemes that can adjust playback speed, for example, when combined with metadata. Crowd sourcing, by analyzing other user's habits of fast forwarding/rewinding, can be used to generate a heat map of which sections of the program are the most important, and playback speeds can be set or recommended accordingly (e.g., speed up the least popular portions). For example, if a crowd sourced heat map exists showing 50% of users fast forward between 4:30-6:30, an additional modifier of 1.1 might be multiplied to the calculation. But if the crowd sourced heat map exists showing that 70% of all users fast forward between 11:30-13:30, then a higher multiplier of 1.25 might be used.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   determining, by a computing device, a playback speed recommendation for a first segment of content, wherein the playback speed recommendation is associated with a third party and comprises a minimum playback speed, a maximum playback speed, and an average playback speed;
   determining a playback speed preference associated with a user of a user device;
   determining, based on the playback speed preference and one or more of the minimum playback speed, the maximum playback speed, or the average playback speed, a playback speed at which the first segment of the content is to be presented and an audio pitch for presenting audio at the determined playback speed; and
   transmitting, by the computing device to the user device, the first segment of the content having the determined playback speed at which the first segment of the content is to be presented and audio at the determined audio pitch.

2. The method of claim 1, wherein determining the playback speed preference comprises receiving, by the computing device from the user device, an indication of a preferred rate of syllables spoken within a time period.

3. The method of claim 1, further comprising determining, based on the playback speed preference, a second playback speed at which a second segment of the content is to be presented, wherein the second playback speed is different than the determined playback speed.

4. The method of claim 1, wherein determining the playback speed recommendation for the first segment of the content is based on a playback profile.

5. The method of claim 4, wherein the playback profile comprises one or more of a minimum playback speed, an average playback speed, or a maximum playback speed.

6. The method of claim 1, wherein the third party comprises a director of the content.

7. The method of claim 1, wherein determining the playback speed recommendation for the first segment of the content comprises receiving, by an additional user that consumed the first segment of the content, a playback speed associated with the first segment of the content.

8. A method comprising:
   determining, by a computing device, a playback speed recommendation for a first segment of content, wherein the playback speed recommendation is associated with a third party and comprises a minimum playback speed, a maximum playback speed, and an average playback speed;
   determining a playback speed preference associated with a user of the computing device;
   determining, based on the playback speed preference and one or more of the minimum playback speed, the maximum playback speed, or the average playback speed, a playback speed at which the first segment of the content is to be presented and an audio pitch for presenting audio at the determined playback speed; and
   causing, on a display device, output of the first segment of the content having the determined playback speed at which the first segment of the content is to be presented and audio at the determined audio pitch.

9. The method of claim 8, wherein determining the playback speed preference comprises receiving, by the computing device, an indication of a preferred rate of syllables spoken within a time period.

10. The method of claim 8, further comprising determining, based on the playback speed preference, a second playback speed at which a second segment of the content is to be presented, wherein the second playback speed is different than the determined playback speed.

11. The method of claim 8, wherein determining the playback speed at which the first segment of the content is to be presented is based on a playback profile.

12. The method of claim 11, wherein the playback profile comprises one or more of a preferred minimum playback speed, a preferred average playback speed, or a preferred maximum playback speed.

13. The method of claim 8, wherein the third party comprises a director of the content.

14. The method of claim 8, wherein determining the playback speed at which the first segment of the content is to be presented comprises receiving, by an additional user that consumed the first segment of the content, a playback speed associated with the first segment of the content.

15. A method comprising:
   determining, by a computing device, a playback speed recommendation for a first segment of content, wherein the playback speed recommendation is associated with a third party and comprises a minimum playback speed, a maximum playback speed, and an average playback speed;
   determining an audio playback setting associated with a user of the computing device;
   determining, based on the audio playback setting and one or more of the minimum playback speed, the maximum playback speed, or the average playback speed, a playback speed at which the first segment of the content is to be presented and an audio pitch for presenting audio at the determined playback speed; and
   causing, on a display device, output of the first segment of the content having the determined playback speed at which the first segment of the content is to be presented and audio at the determined audio pitch.

16. The method of claim 15, wherein the audio playback setting comprises a rate of syllables spoken within a time period.

17. The method of claim 16, wherein determining the audio playback setting associated with the user of the computing device comprises determining, based on closed caption data, the rate of syllables spoken within the time period.

18. The method of claim 15, further comprising determining a second playback speed at which a second segment of the content is to be presented, wherein the second playback speed is different than the determined playback speed.

19. The method of claim 15, wherein determining the playback speed at which the first segment of the content is to be presented is based on a playback profile.

20. The method of claim 15, wherein the playback profile comprises one or more of a preferred minimum playback speed, a preferred average playback speed, or a preferred maximum playback speed.

* * * * *